US008824169B2

United States Patent
Wang et al.

(10) Patent No.: US 8,824,169 B2
(45) Date of Patent: Sep. 2, 2014

(54) MULTIPLE INVERTER AND ACTIVE POWER FILTER SYSTEM

(75) Inventors: Bin Wang, Shanghai (CN); Pude Yu, Shanghai (CN); Wentao Zhan, Shanghai (CN); Hongyang Wu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 224 days.

(21) Appl. No.: 13/617,292

(22) Filed: Sep. 14, 2012

(65) Prior Publication Data
US 2013/0229838 A1 Sep. 5, 2013

(30) Foreign Application Priority Data
Mar. 2, 2012 (CN) .......................... 2012 1 0054349

(51) Int. Cl.
*H02M 3/335* (2006.01)
*H02M 1/12* (2006.01)

(52) U.S. Cl.
USPC ............... 363/17; 363/39; 363/40; 363/41; 363/95; 363/98; 363/131; 363/132

(58) Field of Classification Search
CPC ..... H02M 1/12; H02M 1/126; H02M 7/5387; H02M 2001/0067
USPC .............. 363/17, 39, 40, 41, 95, 98, 131, 132
See application file for complete search history.

(56) References Cited

U.S. PATENT DOCUMENTS

| 6,690,592 | B2 * | 2/2004 | Link ................................ 363/98 |
| 6,850,424 | B2 * | 2/2005 | Baudelot et al. ................ 363/37 |
| 7,187,229 | B2 * | 3/2007 | Pelly ............................. 327/551 |
| 8,310,848 | B2 * | 11/2012 | Sakakibara .................... 363/37 |
| 8,670,260 | B2 * | 3/2014 | Wang et al. .................... 363/131 |
| 2002/0172063 | A1 * | 11/2002 | Link ............................. 363/132 |
| 2007/0030706 | A1 * | 2/2007 | Wei et al. ........................ 363/44 |
| 2008/0180164 | A1 * | 7/2008 | Pelly ............................. 327/552 |
| 2011/0299311 | A1 * | 12/2011 | Zhu et al. ..................... 363/132 |

* cited by examiner

Primary Examiner — Bao Q Vu
(74) Attorney, Agent, or Firm — Morris Manning & Martin LLP; Tim Tingkang Xia, Esq.

(57) ABSTRACT

A multiple inverter with neutral line inductor and an active power filter system are disclosed. In the disclosure, the multiple inverter comprises at least two inverter units connected in parallel, the midpoint of the direct current bus in each inverter unit is connected to the neutral line N through the respective neutral line inductor. The multiple inverter can suppress the ripple produced by the neutral line current without increasing the direct current bus capacitor.

20 Claims, 9 Drawing Sheets

MULTIPLE INVERTER AND ACTIVE POWER FILTER SYSTEM

CROSS-REFERENCE TO RELATED APPLICATION

This non-provisional application claims priority under 35 U.S.C. §119(a) on Patent Application No. 201210054349.4 filed in P.R. China on Mar. 2, 2012, the entire contents of which are hereby incorporated by reference.

FIELD OF THE INVENTION

The invention relates to an inverter structure. More particularly, it relates to a multiple inverter circuit and an active power filter system.

BACKGROUND OF THE INVENTION

With rapid development of the power electronic technology, the power electronic device has more wide application. Wherein, the inverter is used widely in power system, such as uninterruptible power supply (UPS), active power filter (APF), static var generator (SVG), and the like. In the art, various attempts and efforts have been made aiming at improving the respective specifications, such as decreasing the volume of the inverter, improving the efficiency of the inverter, reducing the cost of the inverter, diminishing the output harmonic of the inverter, the comparability of three-phase-three-wire and three-phase-four-wire, and the like. However, various circuit topologies have their respective limitations, and the respective problems which cannot be solved excellently.

Figure 1:
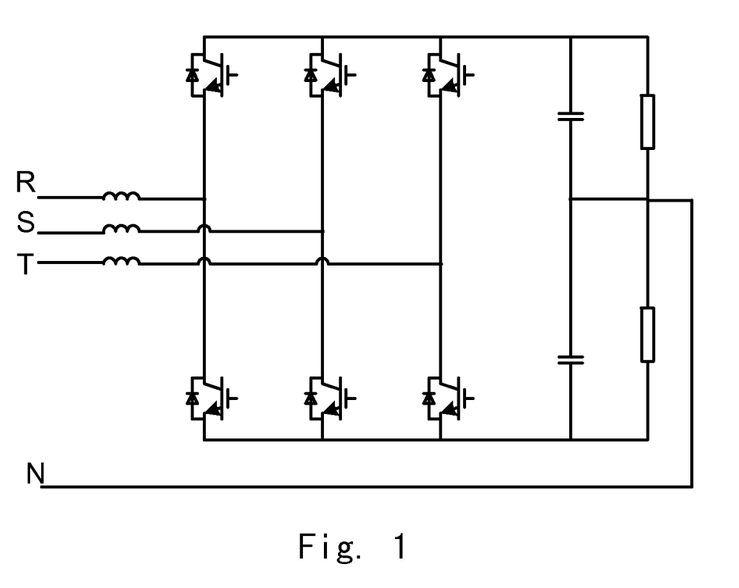
FIG. 1 shows a schematic diagram of a structure of a traditional two-level inverter of three-phase-four-wire connection.
Figure 2:
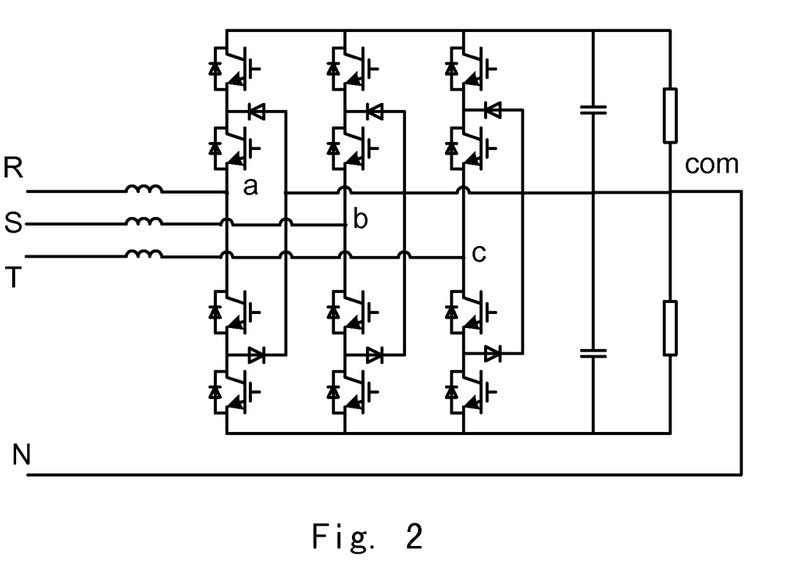
FIG. 2 shows a schematic diagram of a structure of a traditional three-level inverter of three-phase-four-wire connection.

For example, the prior inverter topology is shown mainly in FIG. 1~FIG. 2. FIG. 1 shows a conventional three-phase-four-wire (3p4w) structure of two-level inverter, in which the neutral line (N line) is connected directly with the midpoint of a direct current bus. Because of the existence of the neutral line, the three phases are decoupled completely, and can be controlled individually. However, the neutral line current flows through the direct current bus, it is required to design a large direct current bus capacitor in order to suppress the ripple current. FIG. 2 shows a 3p4w structure of a traditional three-level inverter. Similarly, the neutral line (N line) is connected directly with the midpoint of the direct current bus. The harmonic component at the input side can be decreased in the three-level inverter, however, it is also required to design a large direct current bus capacitor.

In the prior art, IGBT of higher voltage is required to be selected for the two-level inverter, and the efficiency and the switching frequency will be small. In the two topologies as shown in FIG. 1 and FIG. 2, three phases are decoupled by the neutral line and has larger ripple by comparing with a three-phase-three-wire (3p3w) structure. At the same time, the 3p4w structure needs a large direct current bus capacitor in design of suppressing the ripple produced by the neutral line current.

SUMMARY OF THE INVENTION

An object of the invention is to solve one of the above problems, and to provide a multiple inverter including at least one of the following advantages, that is, suppressing the ripple, decreasing the direct current bus capacitor, improving the efficiency, lower cost or more wild application in different conditions.

Another object of the invention is to provide an active power filter system including the above multiple inverter disposed internally therein, it has at least one of the following advantages, such as the ripple produced by the neutral line current can be suppressed, the direct current bus capacitor is not required to be increased, the efficiency can be improved, the cost can be decreased.

The technical scheme of the invention is: a multiple inverter is disclosed in the invention, said multiple inverter comprising:

a neutral line;

at least two inverter units, wherein each inverter unit comprises:

a three-phase inverter bridge including a plurality of switching devices;

a direct current bus, comprising at least one capacitor, said direct current bus and said three-phase inverter bridge are connected in parallel; and an inverter unit output inductor module comprising a first phase inverter unit output inductor module, a second phase inverter unit output inductor module, and a third phase inverter unit output inductor module, wherein each phase inverter unit output inductor module comprises at least one inductor, one terminal of the first phase, the second phase, and the third phase inverter unit output inductor module is coupled correspondingly to the first phase, the second phase, and the third phase of the three-phase inverter bridge, respectively;

a neutral line inductor module, comprising at least one inductor, one terminal of said neutral line inductor module is coupled to the midpoint of said direct current bus, another terminal of said neutral line inductor module is coupled to the neutral line of said multiple inverter;

three-phase outputs of the multiple inverter, comprising a first phase output, a second phase output and a third phase output, another terminals of the first phase inverter unit output inductor modules of all the inverter units are coupled to the first phase output of the multiple inverter, another terminals of the second phase inverter unit output inductor modules of all the inverter units are coupled to the second phase output of the multiple inverter, another terminals of the third phase inverter unit output inductor modules of all the inverter units are coupled to the third phase output of the multiple inverter.

According to an embodiment of the multiple inverter of the invention, each inverter unit of said at least two inverter units further comprises a neutral line switching device, said neutral line switching device is connected in series with the neutral line inductor module of said inverter unit.

According to an embodiment of the multiple inverter of the invention, said multiple inverter further comprises:

multiple inverter output inductor module, comprising a first phase multiple inverter output inductor module, a second phase multiple inverter output inductor module, and a third phase multiple inverter output inductor module, each phase multiple inverter output inductor module comprises at least one inductor, the first phase, the second phase, and the third phase multiple inverter output inductor module respectively connects all the first phase, all the second phase and all the third phase inverter output inductor modules with the first phase, the second phase and the third phase output of said multiple inverter correspondingly;

three coupling points, the first coupling point is a joint point of the first phase inverter unit output inductor modules in all the inverter units and the first phase multiple inverter output inductor module, the second coupling point is a joint point of the second phase inverter unit output inductor modules in all the inverter units and the second phase multiple inverter output inductor module, and the third coupling point is a joint point of the third phase inverter unit output inductor modules of in all the inverter units and the third phase multiple inverter output inductor module; and three groups of filter assemblies, comprising a first group of filter assemblies, a second group of filter assemblies, and a third group of filter assemblies, each group of filter assemblies comprises at least one capacitor, the first group, the second group and the third group of filter assemblies is coupled correspondingly to the first, the second, and the third coupling point, respectively.

According to an embodiment of the multiple inverter of the invention, each group of filter assemblies comprises at least two capacitors connected in parallel and/or in series.

According to an embodiment of the multiple inverter of the invention, each group of filter assemblies comprises a damping filter including capacitors and resistors.

According to an embodiment of the multiple inverter of the invention, each group of filter assemblies comprises a notch filter including capacitors and inductors.

According to an embodiment of the multiple inverter of the invention, each group of filter assemblies comprises notch filter including capacitors, inductors and damping filter including capacitors, resistors, wherein said notch filter and damping filter are connected in parallel.

According to an embodiment of the multiple inverter of the invention, said multiple inverter further comprising:

at least two current detectors, each current detector connected in series with one said inverter unit output inductor module for sampling the output current of said inverter unit; and a control circuit, comprising:

at least two controllers, wherein each controller receives the current values from said current detector and a set reference signal and outputs a duty cycle signal; and at least two drive signal generators, wherein each drive signal generator receives the duty cycle signal and a modulated carrier signal and outputs a drive signal to control the corresponding inverter unit.

According to an embodiment of the multiple inverter of the invention, the drive signals of the two inverter units shift between each other.

According to an embodiment of the multiple inverter of the invention, said inverter unit is a two-level inverter unit or a three-level inverter unit According to an embodiment of the multiple inverter of the invention, the three-level inverter unit is a three-level flying capacitor inverter unit or a three-level neutral point clamped inverter unit.

An active power filter system is also disclosed in the invention, said active power filter system comprises:

a harmonic detection and extraction circuit, the non-linear load current of said active power filter system is detected by said harmonic detection and extraction circuit; and a multiple inverter as described in Claim 8, wherein the harmonic and the reactive current components extracted by said harmonic detection and extraction circuit is the set reference signal of the control circuit of said multiple inverter as claimed in Claim 8.

According to an embodiment of the active power filter system of the invention, each inverter unit of said at least two inverter units of said multiple inverter further comprises a neutral line switching device, said neutral line switching device is connected in series with the neutral line inductor module of said inverter unit.

According to an embodiment of the active power filter system of the invention, said multiple inverter further comprises:

multiple inverter output inductor module, comprising a first phase multiple inverter output inductor module, a second phase multiple inverter output inductor module, and a third phase multiple inverter output inductor module, each phase multiple inverter output inductor module comprises at least one inductor, the first phase, the second phase, and the third phase multiple inverter output inductor module respectively connects all the first phase, all the second phase and all the third phase inverter output inductor modules with the first phase, the second phase and the third phase output of said multiple inverter correspondingly;

three coupling points, the first coupling point is a joint point of the first phase inverter unit output inductor modules in all the inverter units and the first phase multiple inverter output inductor module, the second coupling point is a joint point of the second phase inverter unit output inductor modules in all the inverter units and the second phase multiple inverter output inductor module, and the third coupling point is a joint point of the third phase inverter unit output inductor modules of in all the inverter units and the third phase multiple inverter output inductor module; and three groups of filter assemblies, comprising a first group of filter assemblies, a second group of filter assemblies, and a third group of filter assemblies, each group of filter assemblies comprises at least one capacitor, the first group, the second group and the third group of filter assemblies is coupled correspondingly to the first, the second, and the third coupling point, respectively.

According to an embodiment of the active power filter system of the invention, each group of filter assemblies of said multiple inverter comprises at least two capacitors connected in parallel and/or in series.

According to an embodiment of the active power filter system of the invention, each group of filter assemblies of said multiple inverter comprises a damping filter including capacitors and resistors.

According to an embodiment of the active power filter system of the invention, each group of filter assemblies of said multiple inverter comprises notch filter including capacitors and inductors.

According to an embodiment of the active power filter system of the invention, each group of filter assemblies of said multiple inverter comprises a notch filter including capacitors, inductors and a damping filter including capacitors, resistors, said notch filter and said damping filter are connected in parallel.

According to an embodiment of the active power filter system of the invention, the drive signals of the inverter units shift by preset angle between each other.

According to an embodiment of the active power filter system of the invention, said at least inverter unit is a two-level inverter unit or a three-level inverter unit.

The topology disclosed in present invention: in each inverter unit, the midpoint of the direct current bus is connected to the neutral line through its own neutral line inductor. By comparing with the prior art, the ripple produced by the neutral line current in the topology disclosed herein can be suppressed without increasing the direct current bus capacitor, the efficiency may be improved.

DETAIL DESCRIPTION OF THE EMBODIMENTS

The embodiments accompanied by the drawings are further described herein to help understand present invention.

Figure 3:
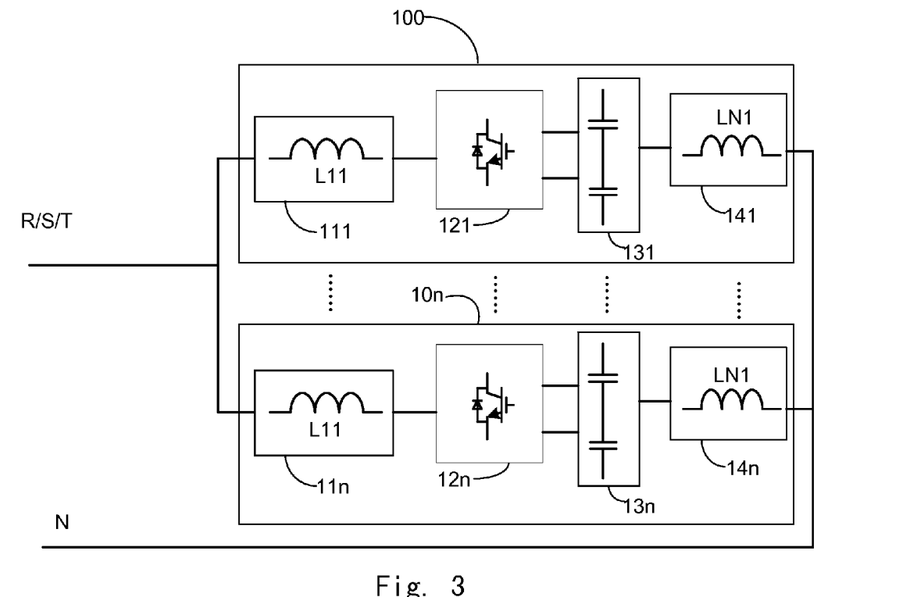
FIG. 3 shows a schematic diagram of a multiple inverter with neutral line inductor in an embodiment of the invention.

FIG. 3 shows a multiple inverter with neutral line inductor in an embodiment of the invention. Referring to FIG. 3, the multiple inverter in the embodiment comprises a neutral line N, at least two inverter units 100~10n, and three-phase outputs of the multiple inverter. The inverter unit 100 comprises a three-phase inverter bridge 121 including a plurality of switching devices, a direct current bus 131, an inverter unit output inductor module 111, and a neutral line inductor module 141. The direct current bus comprises at least one capacitor. The direct current bus 131 and the three-phase inverter bridge 121 are connected in parallel. The inverter unit output inductor module 111 comprises a first phase inverter unit output inductor module, a second phase inverter unit output inductor module, and a third phase inverter unit output inductor module. Each phase inverter unit output inductor module comprises at least one inductor. One terminal of the first phase, the second phase, and the third phase inverter unit output inductor module is coupled correspondingly to the first phase, the second phase, and the third phase of the three-phase inverter bridge 121, respectively. The neutral line inductor module 141 comprises at least one inductor LN1. One terminal of the neutral line inductor module 141 is coupled to the midpoint of the direct current bus 131, another terminal is coupled to the neutral line N of the multiple inverter. The structure of other inverter units in the multiple inverter are the same as those of the inverter unit 100, and it will not be repeated herein. The three-phase outputs of the multiple inverter comprises a first phase output, a second phase output and a third phase output. Another terminals of the first phase inverter unit output inductor modules of all the inverter units in the multiple inverter are connected together to form the first phase output of the multiple inverter. Another terminals of the second phase inverter unit output inductor modules of all the inverter units in the multiple inverter are connected together to form the second phase output of the multiple inverter. Another terminals of the third phase inverter unit output inductor modules of all the inverter units in the multiple inverter are connected together to form the third phase output of the multiple inverter.

Figure 4:
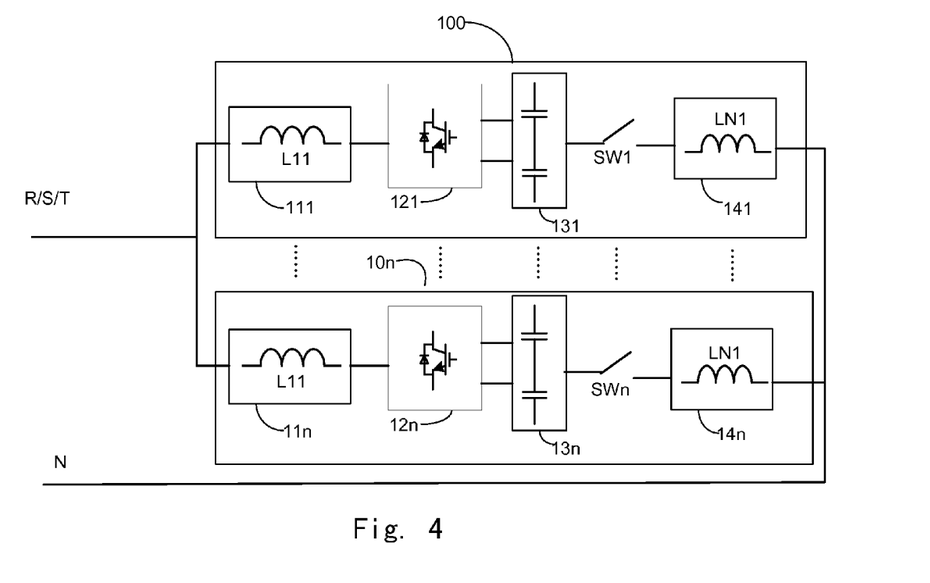
FIG. 4 shows a schematic diagram of a multiple inverter with neutral line inductor in another embodiment of the invention.

In an embodiment of the invention as shown in FIG. 4, each inverter unit of the multiple inverter further comprises a neutral line switching device. For example, the inverter unit 100 comprises a neutral line switching device SW1, the inverter unit 10n comprises a neutral line switching device SWn. The neutral line switching device in each inverter unit of the multiple inverter is connected in series with the neutral line inductor module of said inverter unit. As shown in FIG. 4, the neutral line switching device SW1 of the inverter unit 100 is connected in series with the neutral line inductor module 141 of the inverter unit 100, the neutral line switching device SWn of the inverter unit 10n is connected in series with the neutral line inductor module 14n of the inverter unit 10n. If the neutral line switching device in each inverter unit of the multiple inverter is closed, then the neutral line inductor module will be connected to the midpoint of the direct current bus to form a 3p4w structure. If the neutral line switching device in each inverter unit of the multiple inverter is opened, then the neutral line inductor module and the midpoint of the direct current bus of said inverter unit will be disconnected to form a 3p3w structure. Therefore, the compatibility of two structures of 3p3w and 3p4w can be implemented.

Figure 5:
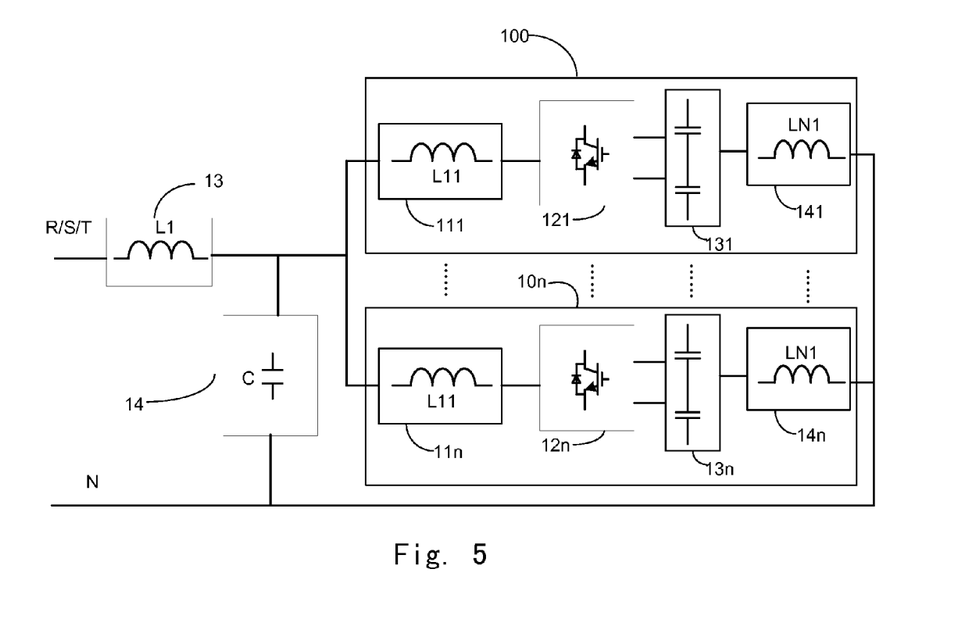
FIG. 5 shows a schematic diagram of a multiple inverter with neutral line inductor in another embodiment of the invention.

In an embodiment of the invention as shown in FIG. 5, the multiple inverter can further comprises a multiple inverter output inductor module 13, three coupling points, three groups of filter assemblies 14. Wherein the multiple inverter output inductor module 13 comprises a first phase multiple inverter output inductor module, a second phase multiple inverter output inductor module, and a third phase multiple inverter output inductor module. Each phase multiple inverter output inductor module comprises at least one inductor. The first phase, the second phase, and the third phase multiple inverter output inductor module is coupled correspondingly with the first phase, the second phase and the third phase output of the multiple inverter, respectively.

The first coupling point is formed by a connection point between another terminal of the first phase inverter unit output inductor module of each inverter unit and the first phase multiple inverter output inductor module. The second coupling point is formed by a connection point between another terminal of the second phase inverter unit output inductor module of each inverter unit and the second phase multiple inverter output inductor module. The third coupling point is formed by a connection point between another terminal of the third phase inverter unit output inductor module of each inverter unit and the third phase multiple inverter output inductor module.

Three groups of filter assemblies 14, comprise a first group of filter assemblies, a second group of filter assemblies, and a third group of filter assemblies. Each group of filter assemblies comprises at least one capacitor. The first group, the second group and the third group of filter assemblies is coupled correspondingly to the first, the second, and the third coupling point, respectively. A LCL filter is formed by the capacitor in the filter assembly and the inductor in the multiple inverter output inductor module and the inductor in the inverter unit output inductor module of the inverter unit for suppressing the output harmonic of the multiple inverter. Meanwhile, each group of filter assemblies could choose to connect or disconnect with the neutral line N of the multiple inverter.

Each group of filter assemblies comprises at least one capacitor as shown in FIG. 5. The structure may comprise at least two capacitors connected in parallel and/or in series. Apart from using the capacitor as shown in FIG. 5 as a filter assembly, it can also be a damping filter including capacitors and resistors, or a notch filter including capacitors and inductors.

Figure 6:
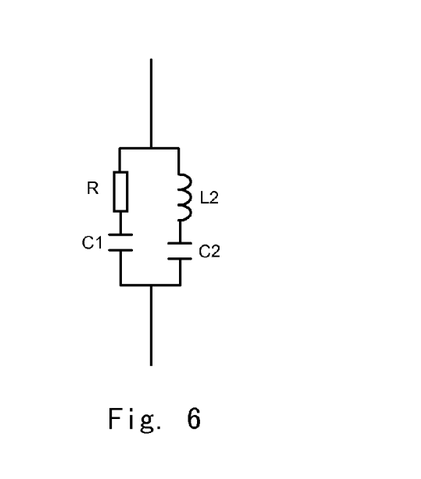
FIG. 6 shows a schematic diagram of a filter assembly in an embodiment of the invention.

Preferably, apart from the forms of the above capacitor and damping filter, it can also be a filter assembly including notch filter structure and damping filter structure as shown in FIG. 6. Wherein the notch filter structure is a structure of capacitor C2 and inductor L2 connected in series, the damping filter structure is a structure of resistor R and capacitor C1 connected in series. The notch filter and the damping filter can be connected in parallel. A LCL filter including notch filter is formed by the capacitor of the filter assembly and inductor in the multiple inverter output inductor module and the inductor in the inverter unit output inductor module of the inverter unit. The difficulty on design of filter assembly and the volume of the filter assembly can be reduced significantly and the filter efficiency can be improved by the LCL filter with notch filter.

Figure 7:
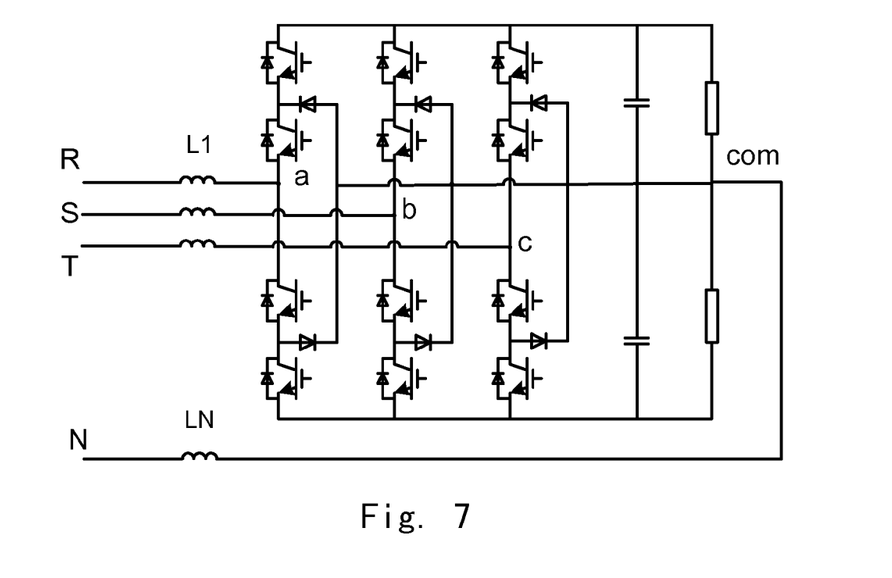
FIG. 7 shows a schematic diagram of a structure of a three-level inverter of three-phase-four-wire connection including neutral line inductor in the invention.
Figure 8:
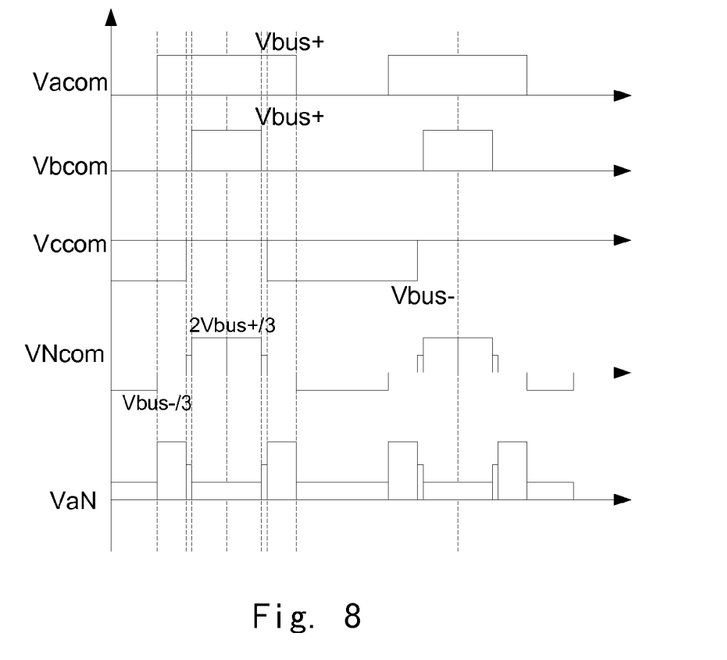
FIG. 8 shows a inductor ripple analysis diagram of different connection structures of three-phase-three-wire and three-phase-four-wire.

FIG. 7 shows a schematic diagram of a three-level inverter of three-phase-four-wire connection structure comprising neutral line inductor. The inverter unit output inductor module L1 is connected to the midpoints a, b, c of the three-phase inverter bridge arm, respectively. The midpoint com of the direct current bus is connected to the neutral line N of the grid through the neutral line inductor LN. FIG. 8 shows a voltage relationship diagram among different nodes in different connection structures of three-phase-three-wire and three-phase-four-wire, and can be used to analyze the magnitude of the inductor ripple. Vacom, Vbcom, Vccom represent the voltage waveforms of the midpoint of the bridge arm with respect to the midpoint of the direct current bus capacitor, respectively. It is a switching square waveform because of the switching modulation. If the midpoint com of the direct current bus is connected directly with N in the three-phase-four-wire structure, then the switching square waveform will be loaded directly to the inductor L1, and the ripple on the inductor L1 will be large. If point com and point N are not connected directly, then it will be deduced from the relationship of three phase that the voltage relationship between point com and point N is:

$$VNcom = \frac{Vacom + Vbcom + Vccom}{3},$$

then it will be obtained a voltage waveform of VNcom as shown by VNcom in the FIG. 8. Then the voltage on the inductor L1 will be VaN: VaN=Vacom−VNcom, as shown in the FIG. 8. It can be seen that the ripple of VaN is smaller than that of Vacom. Therefore, the ripple on the inductor L1 will be smaller compared with ripple on the inductor L1 in the three-phase-four-wire structure which the midpoint of the direct current bus is connected directly with point N (the neutral line). Furthermore, in a structure not connected directly as shown in FIG. 7, the neutral line inductor LN can be increased while the inductor ripple output by the inverter can be smaller to alleviate the load of direct current bus capacitor for suppressing the ripple. Comparing with the structure that the midpoint com of the direct current bus are connected directly with N, the structure with neutral line inductor module could lower the difficulty on design of the direct current bus capacitor, the inductance of the inverter unit output inductor module can be designed to be smaller or be the same as that of three-phase-three-wire.

Figure 9:
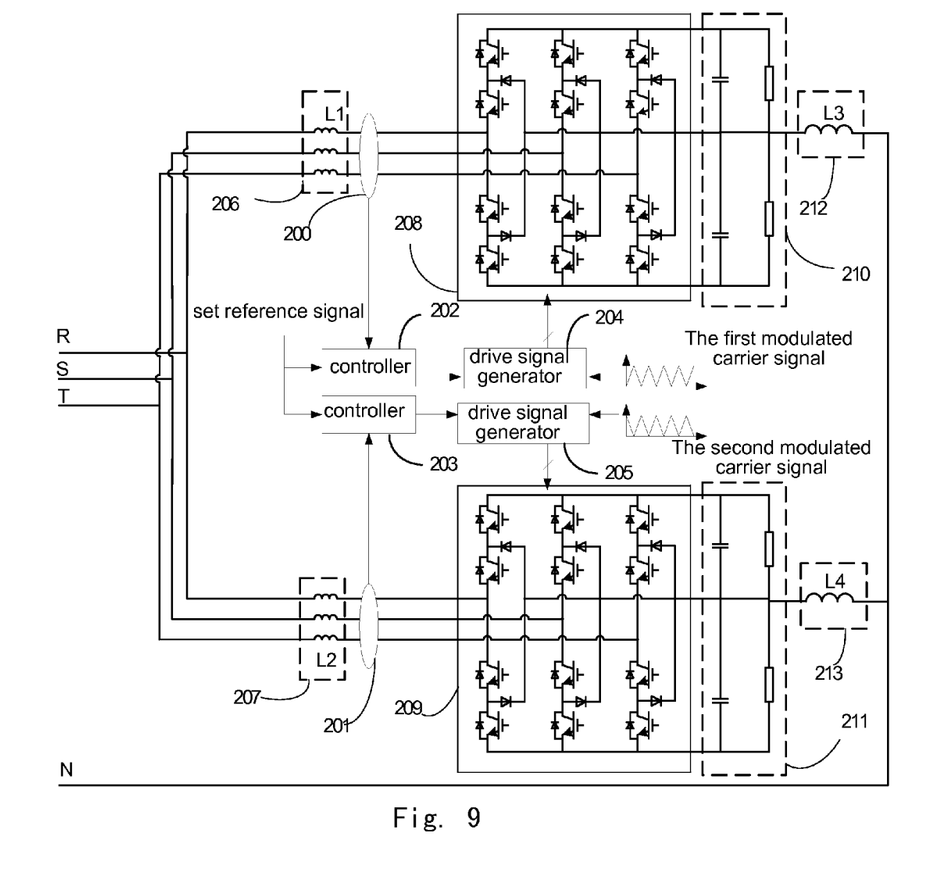
FIG. 9 shows a three-phase-four-wire connection structure of a multiple three-level inverter including neutral line inductor and interleaving and connecting in parallel in an embodiment of the invention.

The operation principle will be described as follows by taking the multiple inverter comprising two inverter units as an example. FIG. 9 shows a three-phase-four-wire connection structure of a multiple three-level inverter with neutral line inductor module and interleaving and connecting in parallel in an embodiment of the invention. As shown in FIG. 9, the multiple inverter in the embodiment comprises a neutral line N, two inverter units, three-phase outputs of the multiple inverter. The first inverter unit comprises a three-phase inverter bridge 208 including a plurality of switching devices, a direct current bus 210, an inverter unit output inductor module 206, a neutral line inductor module 212. The direct current bus 210 comprises at least one capacitor. The direct current bus 210 and the three-phase inverter bridge 208 are connected in parallel. The inverter unit output inductor module 206 comprises a first phase inverter unit output inductor module, a second phase inverter unit output inductor module, and a third phase inverter unit output inductor module, wherein each phase inverter unit output inductor module comprises at least one inductor. One terminal of the first phase, the second phase, and the third phase inverter unit output inductor module is coupled correspondingly to the first phase, the second phase, and the third phase of the three-phase inverter bridge 208, respectively. The neutral line inductor module 212 comprises at least one inductor L3, one terminal of said neutral line inductor module 212 is coupled to the midpoint of said direct current bus 210, another terminal is coupled to the neutral line N of said multiple inverter. The three-phase outputs of the multiple inverter comprises a first phase output, a second phase output and a third phase output. Another terminals of the first phase inverter unit output inductor modules of all the inverter units are connected together to form the first phase output of the multiple inverter. Another terminals of the second phase inverter unit output inductor modules of all the inverter units are connected together to form the second phase output of the multiple inverter. Another terminals of the third phase inverter unit output inductor modules of all the inverter units are connected together to form the third phase output of the multiple inverter. The inverter unit further comprises a neutral line switching device. The neutral line switching device is connected in series with the neutral line inductor module 212 of the inverter unit. The structure of another inverter unit is similar, and it will not be repeated herein. In an embodiment of the invention, a control circuit can also be introduced to the multiple inverter as shown in FIG. 9.

The above control circuit comprises current detectors 200, 201, controllers 202, 203, drive signal generators 204, 205 as shown in FIG. 9, Wherein the current detector 200 is connected in series with the output inductor module 206 of the first inverter unit of the multiple inverter, the current detector 201 is connected in series with the output inductor module 207 of the second inverter unit of the multiple inverter. The function of the current detectors 200, 201 is to sample the output current of the corresponding inverter unit.

The input of the controller 202 is connected with the output of the current detector 200; the input of the controller 203 is connected with the output of the current detector 201. The function of the controllers 202, 203 is to receive the current values from the current detectors 200, 201, and to output the duty cycle signals of the corresponding inverter units by incorporating a set reference signal, and to deliver duty cycle signals to the drive signal generators 204, 205, respectively.

The input of the drive signal generator 204 is connected with the output of the controller 202, the input of the drive signal generator 205 is connected with the output of the controller 203. The function of the drive signal generators 204, 205 is to compare the corresponding duty cycle signals with the first modulated carrier signal, the second modulated carrier signal, respectively, and to output the drive signal of the switching device of the corresponding inverter unit.

In the above structure, the modulated carrier signals of two inverter units shift by 180 degrees between each other. Corresponding to the modulated carrier signals shifted by 180 degrees between each other, the drive signals of the two inverter units also have a difference of shift by 180 degrees with between each other. And the corresponding output current waveforms of the two inverter units also have a difference of 180 degrees with each other. The output currents shifted by 180 degrees between each other converge at the connection point of the inductors L1, L2. If the quantity of the inverter units is n, then the drive signals of the switching devices of the respective inverter units will shift by 360/n degrees with each other, and it will countervailing each other out on the total current. That is, the harmonic of doubled switching frequency will be canceled out by the control circuit. If the switching frequency of a single inverter is 30 KHz, then only the ripple of 60 KHz or above will be presented after the current being superimposed, that is, the ripple of doubled switching frequency and above. Therefore, the difficulty of the design of the filter and direct current bus capacitor in the multiple inverter can be decreased.

Figure 10:
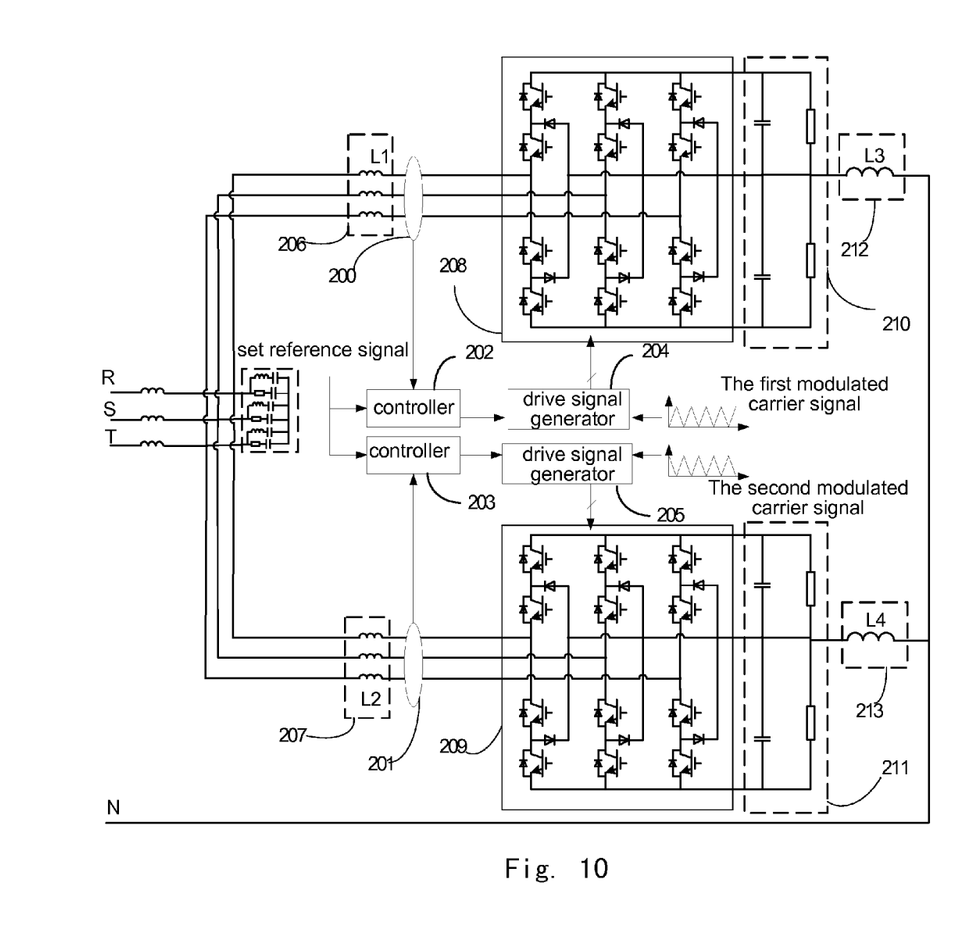
FIG. 10 shows a three-phase-four-wire connection structure of a multiple three-level inverter including neutral line inductor and interleaving and connecting in parallel in another embodiment of the invention.

FIG. 10 shows a structure of the filter assembly and the output inductor, which is formed commonly on the basis of FIG. 9 and notch filter and damping filter have been added therein. The notch filter is designed at a frequency near the doubled switching frequency (may be have an error of 15%), the damping filter is designed for filtering the high frequency harmonic. In this way, the output harmonic of the multiple inverter as shown in FIG. 10 can be further suppressed.

Figure 11:
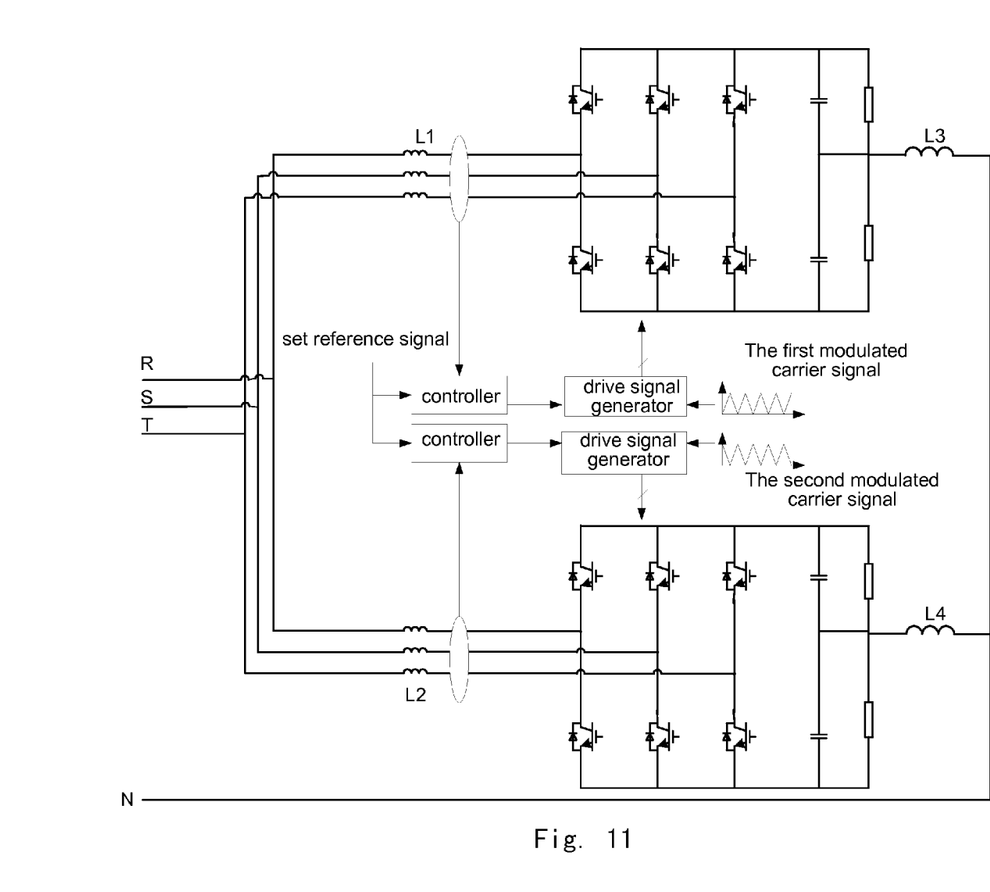
FIG. 11 shows a three-phase-four-wire connection structure of a multiple two-level inverter including neutral line inductor and interleaving and connecting in parallel of the invention.

FIG. 11 shows a three-phase-four-wire connection structure of a multiple two-level inverter, in which the inverter units connected in parallel operate in interleaving mode. Each inverter unit comprises a neutral line inductor. In the embodiment of FIG. 11, similar as FIG. 9, the neutral line inductor and the control circuit have been added on the basis of a traditional multiple two-level inverter, the detail structure of the control circuit is the same as that in FIG. 9. In the two two-level inverters, the midpoint of the two direct current buses are connected to the neutral line N through the respective corresponding neutral line inductors L3 and L4.

Figure 12:
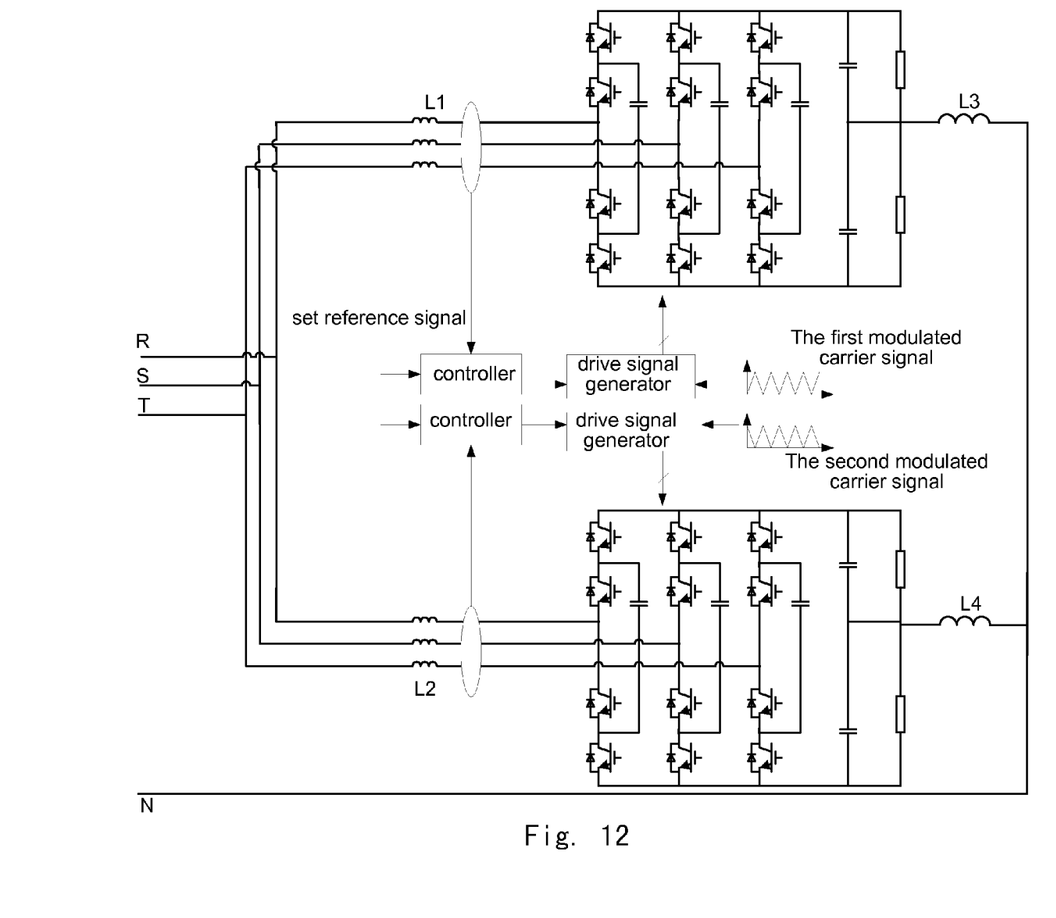
FIG. 12 shows a three-phase-four-wire connection structure of a multiple three-level inverter including neutral line inductor and interleaving and connecting with flying capacitor in parallel of the invention.

The respective inverter units of the multiple inverter can be three-level neutral point clamped inverter units as shown in FIG. 9, or can be other inverter units. FIG. 12 shows a three-phase-four-wire connection structure of a multiple three-level inverter, in which the inverter units connected in parallel operate in interleaving mode. Each inverter unit comprises a neutral line inductor and flying capacitor. Like FIG. 9, in the embodiment of FIG. 12, the neutral line inductor, the control circuit and flying capacitor have been added therein on the basis of a traditional multiple three-level inverter. The detail structure of the control circuit is the same as that in FIG. 9. In two two-level inverters, the midpoint of the direct current buses are connected to the neutral line N through corresponding neutral line inductors L3 and L4 respectively.

Figure 13:
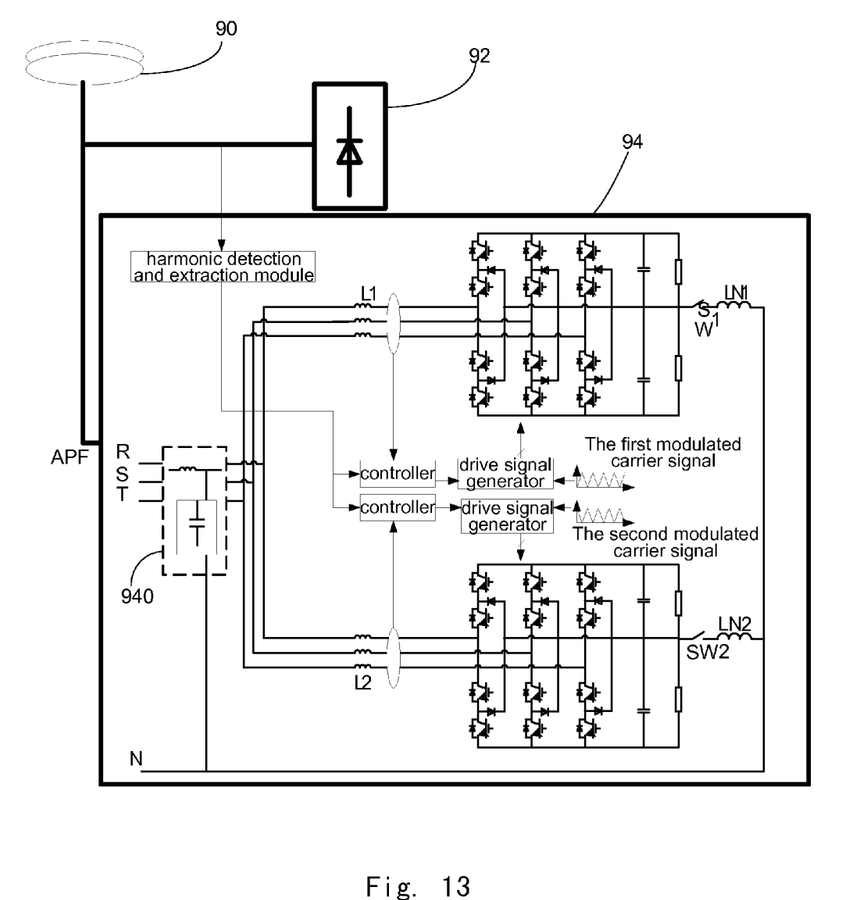
FIG. 13 shows a structure of an active power filter including multiple three-level inverter with neutral line inductor installed therein of the invention.

The above multiple inverter in the invention is applied in the active power filter (APF) system, FIG. 13 shows an APF comprising such multiple inverter disposed therein. FIG. 13 is only an example, various above multiple inverter structures (for example, the multiple inverter working in an interleaving mode and comprising connected in parallel two-level inverter units, or a three-level flying capacitor inverter, or with or without filter assembly) can be applied in the active power filter system.

In FIG. 13, an active power filter system 94 connected at the grid node 90 comprises a harmonic detection and extraction circuit and a multiple three-level inverter. The multiple three-level inverter comprises a filter assembly 940, a control circuit and neutral line inductors LN1, LN2. The specific description of the filter assembly 940 and the control circuit have been described in detail in above, and it will not be repeated herein. The current of the non-linear load 92 (for example, a rectifier diode) is detected by the harmonic detection and extraction circuit. The harmonic and the reactive current components therein are detected, and it is set as a given reference value of the current of the multiple inverter. The output current of the inverter is controlled by the controller of the inverter base on the given reference value of the current. and the carrier waves of these two inverter units shift by 180 degrees between each other. The switching order harmonic of two inverter units can be canceled out by each other. Afterwards, the doubled switching order harmonic or the higher harmonic is diminished by high frequency filter assembly 940, and then it will be outputted through output inductor. The neutral line inductor LN1 and LN2 are connected with the midpoint of the direct current buses and the neutral line of two inverter units, respectively. Switches SW1 and SW2 can be selected to connect in series there between, thereby the comparability of two modes of three-phase-three-wire and three-phase-four-wire can be selected.

The above embodiments are provided to allow those skilled in the ordinary technology of the art to realize and use the invention, various modifications and changes of the above embodiments can be made by those skilled in the ordinary technology of the art without departing the inventive idea of the invention, therefore, the scope of the invention is not limited by the above embodiments, however, it will conform to the largest scope of the inventive characteristics mentioned in the Claims.

What is claimed is:

1. A multiple inverter, wherein said multiple inverter comprising:
   a neutral line;
   at least two inverter units, wherein each inverter unit comprises:
      a three-phase inverter bridge including a plurality of switching devices;
      a direct current bus, comprising at least one capacitor, said direct current bus and said three-phase inverter bridge are connected in parallel; and
      an inverter unit output inductor module comprising a first phase inverter unit output inductor module, a second phase inverter unit output inductor module, and a third phase inverter unit output inductor module, wherein each phase inverter unit output inductor module comprises at least one inductor, one terminal of the first phase, the second phase, and the third phase inverter unit output inductor module is coupled correspondingly to the first phase, the second phase, and the third phase of the three-phase inverter bridge, respectively;
- a neutral line inductor module, comprising at least one inductor, one terminal of said neutral line inductor module is coupled to the midpoint of said direct current bus, another terminal of said neutral line inductor module is coupled to the neutral line of said multiple inverter;
- three-phase outputs of the multiple inverter, comprising a first phase output, a second phase output and a third phase output, another terminals of the first phase inverter unit output inductor modules of all the inverter units are coupled to the first phase output of the multiple inverter, another terminals of the second phase inverter unit output inductor modules of all the inverter units are coupled to the second phase output of the multiple inverter, another terminals of the third phase inverter unit output inductor modules of all the inverter units are coupled to the third phase output of the multiple inverter.

2. The multiple inverter according to claim 1, wherein each inverter unit of said at least two inverter units further comprises a neutral line switching device, said neutral line switching device is connected in series with the neutral line inductor module of said inverter unit.

3. The multiple inverter according to claim 1, wherein said multiple inverter further comprises:
- multiple inverter output inductor module, comprising a first phase multiple inverter output inductor module, a second phase multiple inverter output inductor module, and a third phase multiple inverter output inductor module, each phase multiple inverter output inductor module comprises at least one inductor, the first phase, the second phase, and the third phase multiple inverter output inductor module respectively connects all the first phase, all the second phase and all the third phase inverter output inductor modules with the first phase, the second phase and the third phase output of said multiple inverter correspondingly;
- three coupling points, the first coupling point is a joint point of the first phase inverter unit output inductor modules in all the inverter units and the first phase multiple inverter output inductor module, the second coupling point is a joint point of the second phase inverter unit output inductor modules in all the inverter units and the second phase multiple inverter output inductor module, and the third coupling point is a joint point of the third phase inverter unit output inductor modules of in all the inverter units and the third phase multiple inverter output inductor module; and
- three groups of filter assemblies, comprising a first group of filter assemblies, a second group of filter assemblies, and a third group of filter assemblies, each group of filter assemblies comprises at least one capacitor, the first group, the second group and the third group of filter assemblies is coupled correspondingly to the first, the second, and the third coupling point, respectively.

4. The multiple inverter according to claim 3, wherein each group of filter assemblies comprises at least two capacitors connected in parallel and/or in series.

5. The multiple inverter according to claim 3, wherein each group of filter assemblies comprises a damping filter including capacitors and resistors.

6. The multiple inverter according to claim 3, wherein each group of filter assemblies comprises a notch filter including capacitors and inductors.

7. The multiple inverter according to claim 3, wherein each group of filter assemblies comprises notch filter including capacitors, inductors and damping filter including capacitors, resistors, wherein said notch filter and damping filter are connected in parallel.

8. The multiple inverter according to claim 1, said multiple inverter further comprising:
- at least two current detectors, each current detector connected in series with one said inverter unit output inductor module for sampling the output current of said inverter unit; and
- a control circuit, comprising:
    - at least two controllers, wherein each controller receives the current values from said current detector and a set reference signal and outputs a duty cycle signal; and
    - at least two drive signal generators, wherein each drive signal generator receives the duty cycle signal and a modulated carrier signal and outputs a drive signal to control the corresponding inverter unit.

9. The multiple inverter according to claim 1, wherein the drive signals of the two inverter units shift between each other.

10. The multiple inverter according to claim 1, wherein said inverter unit is a two-level inverter unit or a three-level inverter unit.

11. The multiple inverter according to claim 10, wherein the three-level inverter unit is a three-level flying capacitor inverter unit or a three-level neutral point clamped inverter unit.

12. An active power filter system, wherein said active power filter system comprises:
- a harmonic detection and extraction circuit, the non-linear load current of said active power filter system is detected by said harmonic detection and extraction circuit; and
- a multiple inverter as described in claim 8,
- wherein the harmonic and the reactive current components extracted by said harmonic detection and extraction circuit is the set reference signal of the control circuit of said multiple inverter as claimed in claim 8.

13. The active power filter system according to claim 12, wherein each inverter unit of said at least two inverter units of said multiple inverter further comprises a neutral line switching device, said neutral line switching device is connected in series with the neutral line inductor module of said inverter unit.

14. The active power filter system according to claim 12, wherein said multiple inverter further comprises:
- multiple inverter output inductor module, comprising a first phase multiple inverter output inductor module, a second phase multiple inverter output inductor module, and a third phase multiple inverter output inductor module, each phase multiple inverter output inductor module comprises at least one inductor, the first phase, the second phase, and the third phase multiple inverter output inductor module respectively connects all the first phase, all the second phase and all the third phase inverter output inductor modules with the first phase, the second phase and the third phase output of said multiple inverter correspondingly;
- three coupling points, the first coupling point is a joint point of the first phase inverter unit output inductor modules in all the inverter units and the first phase multiple inverter output inductor module, the second coupling point is a joint point of the second phase inverter unit output inductor modules in all the inverter units and the second phase multiple inverter output inductor module, and the third coupling point is a joint point of the third phase inverter unit output inductor modules of in all the inverter units and the third phase multiple inverter output inductor module; and three groups of filter assemblies, comprising a first group of filter assemblies, a second group of filter assemblies, and a third group of filter assemblies, each group of filter assemblies comprises at least one capacitor, the first group, the second group and the third group of filter assemblies is coupled correspondingly to the first, the second, and the third coupling point, respectively.

15. The active power filter system according to claim 14, wherein each group of filter assemblies of said multiple inverter comprises at least two capacitors connected in parallel and/or in series.

16. The active power filter system according to claim 14, wherein each group of filter assemblies of said multiple inverter comprises a damping filter including capacitors and resistors.

17. The active power filter system according to claim 14, wherein each group of filter assemblies of said multiple inverter comprises notch filter including capacitors and inductors.

18. The active power filter system according to claim 14, wherein each group of filter assemblies of said multiple inverter comprises a notch filter including capacitors, inductors and a damping filter including capacitors, resistors, said notch filter and said damping filter are connected in parallel.

19. The active power filter system according to claim 12, wherein the drive signals of the inverter units shift by preset angle between each other.

20. The active power filter system according to claim 12, wherein said at least inverter unit is a two-level inverter unit or a three-level inverter unit.

* * * * *